Patented July 25, 1933

1,919,761

UNITED STATES PATENT OFFICE

HANS ACKER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF ALKALINE EARTH METAL CYANAMIDES

No Drawing. Application filed July 1, 1931, Serial No. 548,266, and in Germany July 7, 1930.

The present invention relates to the production of alkaline earth metal cyanamides.

I have found that by leading ammonia and aliphatic unsaturated hydrocarbons, especially those which are gaseous at ordinary room temperature, as for example acetylene, ethylene, propylene and the like, over the oxides or carbonates of the alkaline earth metals at temperatures above about 400°, but below 1000° C., advantageously at red heat, the cyanamides of the alkaline earth metals are obtained. The reaction proceeds, for example when employing propylene and calcium oxide, according to the following equation:

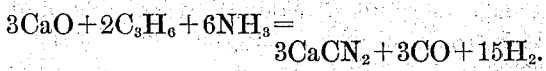
$$3CaO + 2C_3H_6 + 6NH_3 = 3CaCN_2 + 3CO + 15H_2.$$

The fact that this reaction can be carried out is surprising as there are statements in the literature to the effect that calcium cyanamide is decomposed by hydrogen or the nitrogenation in the presence of hydrogen is injuriously affected to a great extent.

The proportions of ammonia and hydrocarbons in the mixture may be selected according to desire; they depend, for example, upon which of the two substances it is desired should be converted to the largest possible extent; the concentration of each of the said two reactants in the gas mixture should, however, amount to at least 5 per cent by volume.

The oxides and carbonates to be employed as initial materials may be from industrial or natural sources.

The conversion of the reaction gases may be increased by the employment of catalysts giving rise to the formation of hydrocyanic acid from hydrocarbons and ammonia, which are mixed with the oxides or carbonates or arranged in front of them. Catalysts of the said nature are well-known in the art. As examples may be mentioned in particular heavy metal oxides, such as nickel, chromium and copper oxides, and also aluminium oxide, especially when it is in the gel form.

It is advantageous to arrange the catalyst so that the gas mixture first comes into contact with the catalyst and then with the alkaline earth metal compound to be nitrogenated.

I have further found that particularly valuable catalysts for the purpose here in question are the phosphates of heavy base metals, preferably those of the heavy metals of groups 5 to 8 of the periodic system or of copper. As examples of such phosphates may be mentioned iron phosphate, copper phosphate and molybdenum phosphate. These phosphates are used on supports. The said catalysts have the great advantage that they are less liable to become contaminated with carbon black or soot and therefore remain active for a longer time. The said catalysts may be prepared for example by intimately mixing the said phosphates with a support material as for example moist China clay and then forming the mixture into the shape of small balls. These are then kept for some time in a drying cupboard until they have become hard, when they are at once ready for use. The proportion of support material for example China clay to metal phosphate should preferably be such that the finished catalyst contains at least one per cent by weight of a heavy metal in the form of its phosphate, but the amount of phosphate should not be so high that the mechanical strength of the catalysts is diminished.

The following examples will further illustrate the nature of this invention, but the invention is not restricted to these examples. The parts are by weight.

Example 1

20 parts of calcium carbonate in a horizontal tube heated to about 600° C. are treated in the course of 12 hours with a gas current consisting of about 13.9 parts of acetylene and 18.2 parts of ammonia. 16 parts of a product containing 30.1 per cent of cyanamide nitrogen, i. e. about 86 per cent of calcium cyanamide are obtained. 32 per cent of the acetylene is converted.

Example 2

80 parts of ammonia together with 56 parts of propylene are led during the course of 1½ hours into the bottom of a vertical tube heated to 800° C. and filled with 90 parts of quicklime in a granulated form. 92 parts of a product containing 4.2 per cent of cyanamide nitrogen, i. e. about 12 per cent of calcium cyanamide, are obtained. About 6.8 per cent of the propylene is converted.

If the lime is supported on a layer of aluminium oxide gel, under otherwise identical conditions 100 parts of a product containing 22.4 per cent of nitrogen, i. e. about 64 per cent of calcium cyanamide are obtained. In this case 40 per cent of the propylene is converted.

Example 3

About 56 parts of propylene and 120 parts of ammonia are led at 800° C. during the course of 1½ hours into the bottom of a vertical tube containing a layer of 150 parts of granular calcium carbonate supported on a layer of aluminium oxide, 115 parts of a product containing 24.6 per cent of nitrogen i. e. about 70 per cent of calcium cyanamide are obtained. About 50 per cent of the propylene is converted.

Example 4

90 parts of ammonia and 56 parts of propylene are led in the course of 1½ hours into the bottom of a vertical tube heated to 800° C. and containing 100 parts of barium oxide supported on a layer of aluminium oxide. 120 parts of a product containing 7.2 per cent of cyanamide nitrogen, i. e. 45 per cent of barium cyanamide are obtained. 15.4 per cent of the propylene is converted.

Example 5

A mixture of 50 parts of butylene with 105 parts of ammonia is passed in the course of an hour at about 800° C. in an upward direction through a vertically arranged tube, in the lower part of which a layer of aluminium oxide gel and above the latter a layer of 50 parts of calcium oxide are arranged. 62 parts of a final product are obtained which contains 22.2 per cent of nitrogen, corresponding to 63.6 per cent of calcium cyanamide. The butylene is converted to the extent of 27.5 per cent.

Example 6

162 parts of ammonia and 62.5 parts of ethylene are passed at 800° C. in the course of an hour first over a catalyst containing 15 per cent of ferric phosphate which has been prepared with the aid of China clay in the manner described above, and then through 90 parts of burnt lime containing 80 per cent of CaO. 95 parts of a product are obtained which contains 23.7 per cent of cyanamide nitrogen, corresponding to a content of 67.7 per cent of calcium cyanamide. 36 per cent of the ethylene used is converted in the said manner.

Example 7

210 parts of ammonia and 125 parts of ethylene are passed at 700° C. in the course of 2 hours first over the catalyst described in Example 6 and then through 120 parts of burnt lime containing 80 per cent of CaO. 25 per cent of the ethylene is converted and 125 parts of a product are obtained, which contains 25.8 per cent of cyanamide nitrogen, corresponding to 73.8 per cent of calcium cyanamide.

Example 8

If under the conditions described in Example 7 a catalyst containing 15 per cent of copper phosphate in mixture with China clay is used as the catalyst at a temperature of 700° C. 120 parts of a product are obtained, which contains 15.4 per cent of cyanamide nitrogen, corresponding to 43.9 per cent of calcium cyanamide, 14.8 per cent of the ethylene used being converted.

If under otherwise same conditions molybdenum phosphate is used instead of copper phosphate at a temperature of 650° C., a product is obtained which contains 17.8 per cent of cyanamide nitrogen corresponding to 50.9 per cent of calcium cyanamide, and 14.5 per cent of the ethylene used is converted.

Example 9

180 parts of ammonia and 123 parts of propylene are passed at 800° C. in the course of 2 hours first over a catalyst containing 15 per cent of ferric phosphate in mixture with China clay and then through 96 parts of burnt lime containing 80 per cent of CaO. 25.7 per cent of the propylene used is converted and 125 parts of a product are obtained, which contains 25.3 per cent of cyanamide nitrogen, corresponding to 72.3 per cent of calcium cyanamide.

Example 10

180 parts of ammonia and 125 parts of ethylene are passed at 700° C. in the course of 2 hours first over a catalyst consisting of 25 parts of copper phosphate, 25 parts of ferric phosphate and 50 parts of China clay and then over 120 parts of burnt lime containing 80 per cent of CaO. The reaction product, of which 120 parts are obtained, contains 17.4 per cent of cyanamide nitrogen corresponding to 49.9 per cent of calcium cyanamide. 16.7 per cent of the ethylene used are converted.

What I claim is:

1. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 400° and 1000° C. over a substance selected from the group consisting of the oxides and carbonates of the alkaline earth metals.

2. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 600° and 800° C. over a substance selected from the group consisting of the oxides and carbonates of the alkaline earth metals.

3. The process of producing alkaline earth metal cyanamides which comprises passing ammonia and an aliphatic, unsaturated hydrocarbon which is gaseous at room temperature, each of said gases being present in an amount of at least 5 per cent of the reaction gas, at a temperature between 400° and 1000° C. over a substance selected from the group consisting of the oxides and carbonates of the alkaline earth metals.

4. The process of producing alkaline earth metal cyanamides which comprises passing ammonia and ethylene, each of said gases being present in an amount of at least 5 per cent of the reaction gas at a temperature between 400° and 1000° C. over a substance selected from the group consisting of the oxides and carbonates of the alkaline earth metals.

5. The process of producing alkaline earth metal cyanamides which comprises passing ammonia and propylene, each of said gases being present in an amount of at least 5 per cent of the reaction gas, at a temperature between 400° and 1000° C. over a substance selected from the group consisting of the oxides and carbonates of the alkaline earth metals.

6. The process of producing calcium cyanamide which comprises passing ammonia and aliphatic, unsaturated hydrocarbon in the gaseous state, each of said gases being present in an amount of at least 5 per cent of the reaction gas, at a temperature between 400° and 1000° C. over a substance selected from the group consisting of calcium oxide and calcium carbonate.

7. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 400° and 1000° C. over a catalyst giving rise to the formation of hydrocyanic acid from hydrocarbons and ammonia and then over a substance selected from the group consisting of the oxides and carbonates of the alkaline earth metals.

8. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 400° and 1000° C. over a catalyst comprising a heavy base metal phosphate on a support and then over a substance selected from the group consisting of the oxides and carbonates of the alkaline earth metals.

9. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 400° and 1000° C. over a catalyst comprising copper phosphate on a support and then over a substance selected from the group consisting of the oxides and carbonates of the alkaline earth metals.

10. The process of producing alkaline earth metal cyanamides which comprises passing ammonia and an aliphatic unsaturated hydrocarbon in the gaseous state, each of said gases being present in an amount of at least 5 per cent of the reaction gas, at a temperature between 400° and 1000° C. over a catalyst comprising a phosphate of a heavy base metal of groups 5 to 8 of the periodic system on a support and then over a substance selected from the group consisting of the oxides and carbonates of the alkaline earth metals.

11. The process of producing alkaline earth metal cyanamides which comprises passing ammonia and an aliphatic unsaturated hydrocarbon in the gaseous state, each of said gases being present in an amount of at least 5 per cent of the reaction gas, at a temperature between 400° and 1000° C. over a catalyst comprising ferric phosphate on a support and then over a substance selected from the group consisting of the oxides and carbonates of the alkaline earth metals.

12. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 400° and 1000° C. over a catalyst comprising molybdenum phosphate on a support and then over a substance selected from the group consisting of the oxides and carbonates of the alkaline earth metals.

13. The process of producing alkaline earth metal cyanamides which comprises passing ammonia and an aliphatic, unsaturated hydrocarbon in the gaseous state, each of said gases being present in an amount of at least 5 per cent of the reaction gas, at a temperature between 600° and 800° C. over a catalyst comprising copper phosphate and ferric phosphate on China clay and then over a substance selected from the group consisting of the oxides and carbonates of the alkaline earth metals.

14. The process of producing alkaline earth metal cyanamides which comprises passing ammonia and ethylene, each of said gases being present in an amount of at least 5 per cent of the reaction gas, at a temperature between 600° and 800° C. over a catalyst comprising copper phosphate and ferric phosphate on China clay and then over a substance selected from the group consisting of the oxides and carbonates of the alkaline earth metals.

HANS ACKER.